Herbert P. Dengler   Inventor

By *Olin B. Johnson*

Patent Attorney

United States Patent Office 3,201,283
Patented Aug. 17, 1965

3,201,283
METHOD AND APPARATUS FOR IMPROVED FUEL CELL OPERATION
Herbert P. Dengler, Fair Haven, N.J., assignor to Esso Research and Engineering Company, a corporation of Delaware
Filed May 11, 1961, Ser. No. 109,431
9 Claims. (Cl. 136—86)

The instant invention relates to a method and apparatus for preventing fuel from migrating across the electrolyte chamber in a fuel cell to the air electrode. More specifically, the instant invention relates to a method and apparatus whereby fuel permeating through the fuel electrode in a fuel cell is withdrawn from the electrolyte chamber prior to its having an opportunity to contact the air electrode.

The fuel cell is now well known in the art and its basic principles of operation well understood. Essentially, the fuel cell comprises a fuel electrode chamber, an electrolyte chamber and an air electrode chamber, these chambers being separated, respectively, by a fuel electrode and an air electrode. A plurality of fuel cells may be connected in series and/or parallel so as to form a compact fuel cell pack. In the operation of such a fuel cell it has been discovered that the fuel tends to permeate through the fuel electrode into the electrolyte chamber and migrate over to the air electrode where it reacts without producing electro-chemical energy as desired. Heretofore, to avoid this, fuel cells have employed a membrane separator in the electrolyte chamber between the air and fuel electrodes. The membrane separators heretofore suggested have been ionic membranes which permit only the flow therethrough of the desired ionic species, usually hydrogen ions and water molecules. These membranes generally have a high electrical resistance which severely limit cell voltage at useful current outputs.

It is an object of the instant invention to prevent the fuel permeating through the fuel electrode from migrating to the air electrode. It is a further object to prevent fuel from migrating to the air electrode without affecting the electrical properties of the electrolyte. It is a further object to achieve this result while simultaneously recovering the fuel from the electrolyte in such a manner that it may be recycled to the fuel electrode chamber.

Further objects of the instant invention will be more readily understood from the following detailed discussion of the instant invention.

Figure 1:
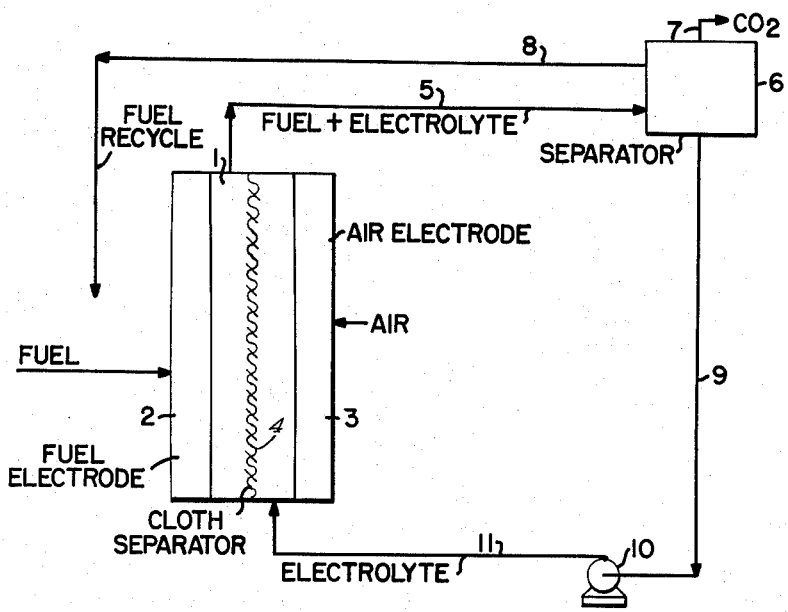
FIGURE 1 is a schematic diagram of the instant invention wherein a porous barrier, such as a cloth, is employed to assist in preventing migration of fuel to the air electrode.

Referring now to FIGURE 1, there is shown for illustrative purposes the cross section of a portion of a fuel cell to illustrate the electrolyte chamber 1 and the fuel and air electrodes 2 and 3, respectively. It will be understood that on the left side of the fuel electrode will be fuel and on the right side of the air electrode 3 will be air or similar oxidizing material. Details of the air electrode chamber and fuel electrode chamber and other electrolyte chambers have not been shown in the instant drawing for means of simplicity, but it will be understood that the arrangement may involve a multiplicity of electrodes, air electrode chambers, electrolyte chambers, and fuel electrode chambers. In the instant embodiment there is located in the electrolyte chamber a porous barrier 4 which is made of a material resistant to chemical attack and which impedes the flow of electrolyte only to the extent of preventing backflow of the fuel to the air electrode. Suitable porous material would be cloth, fine plastic screening and porous ceramics to name only a few. As distinguished from the membranes heretofore employed which prevented all physical flow except for the diffusion of ions or water molecules, the instant porous barrier merely restricts back flow of the fuel.

The barrier 4 extends substantially parallel to the electrodes across the entire width of the electrolyte chamber. As shown it is substantially vertical in position. It may be held in place by any suitable means within the skill of one in the art.

Electrolyte is withdrawn from the electrolyte chamber adjacent the fuel electrode via line 5 and passed to a separator 6 wherein the fuel, electrolyte and carbon dioxide formed in the electrolyte zone are separated. For illustrative purposes it will be assumed that carbon dioxide is formed during the operation of the fuel cell. In the separator 6 the carbon dioxide gas disengages from the liquid and is de-entrained if necessary. The liquid fuel and electrolyte separate into two liquid phases, the electrolyte being the bottom layer. For example with hexane as a fuel and 30% sulfuric acid-water as the electrolyte the two immiscible liquid phases would separate readily because of the large difference in the specific gravities of these materials. Design details for separator 6 need not be discussed as separators of this nature are well known in the art and to design it for any fuel-electrolyte system would be within the ordinary skill of one in the art. Operating conditions of the separator are generally the same as in the fuel cell. It is possible, if desired, to effect heating or cooling of the electrolyte and fuel in the separator. Likewise the electrolyte may be purified in the separator by heating to vaporize the fuel and water therein and recovering the vaporized fuel and water with the vented carbon dioxide.

The carbon dioxide is withdrawn overhead from the separator via line 7 and the fuel withdrawn via line 8 from the separator and recycled to a fuel electrode chamber, in this instance the fuel electrode chamber is on the left side of fuel electrode 2. The electrolyte passes out of the separator via line 9 to a pump 10 wherein it is directed via line 11 back to the electrolyte zone on the right side of the barrier 4. In this manner there is a general convection of the electrolyte from the right side of the electrolyte chamber, through barrier 4 to the left side of barrier 4. Thus the fuel permeating the fuel electrode 2 does not have an opportunity to migrate over to the air electrode 3 wherein it would cause reaction without the production of electro-chemical energy.

Alternatively the electrolyte may be recycled to the upper portion of the electrolyte chamber on the right side of the barrier, if the pressure drop across the barrier is sufficient to insure that some of the electrolyte would flow to the bottom of the electrolyte chamber prior to passing through the porous barrier.

By preventing the fuel from reaching the air electrode operation of a cell of high efficiency can be obtained. The fuel is prevented from reaching the electrode without restriction of the ionic flow such as is incurred with a membrane barrier. Since fuel does not reach the oxygen electrode, it is possible to design this electrode for optimum performance without restriction as to contamination from the fuel or, as mentioned previously, from oxidation of the fuel without production of the desired electrochemical energy.

Figure 2:
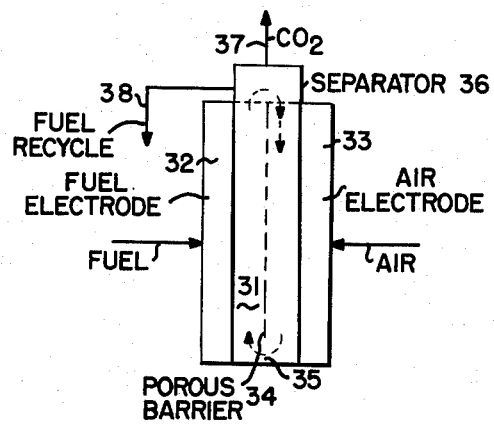
FIGURE 2 is a schematic diagram of an embodiment of the instant invention wherein a porous barrier prevents the carbon dioxide produced in the electrolyte chamber on the fuel electrode from migrating to the air electrode and thus prevents migration of the fuel to the air electrode.

Referring now to FIGURE 2, there is shown a schematic diagram of a cross section of a portion of a fuel cell which may be one of many fuel cells located in a fuel cell pack. An electrolyte chamber 31 is formed by the fuel electrode 32, the air electrode 33, and the fuel cell pack housing. The left side of fuel electrode 32 will be in contact with fuel which migrates through the fuel electrode into contact with the electrolyte to form the desired electro-chemical reaction. On the right side of electrode 33 air or similar oxidizing material will be in contact with the electrode as is well known in the art.

In the instant embodiment there is a porous barrier 34 in the electrolyte chamber, this barrier extending vertically in the electrolyte chamber but not extending downwardly to the bottom of the electrolyte chamber. In other words, there is a passageway 35 beneath the porous barrier 34 wherein electrolyte may circulate without having to pass through the porous barrier 34. This barrier 34 is similar to barrier 4 but its main purpose is to contain the carbon dioxide so it acts as a gas lift to raise both fuel and electrolyte to the surface. It offers a restriction to flow so that the fuel will preferentially rise with the carbon dioxide and electrolyte will circulate as shown in the figure.

With barrier 34 positioned in this manner, the carbon dioxide forming on the fuel electrode will pass upwardly and cause convection of the electrolyte in the electrolyte zone 34. This convection is created by the lower density of the carbon dioxide-fuel-electrolyte mixture at the fuel electrode. This causes the electrolyte to circulate in a clockwise manner around and through porous barrier 34. Overhead of the electrolyte chamber there is a separator 36 which separates the carbon dioxide, fuel and electrolyte, the electrolyte being recycled by convection to the right side of porous barrier 34. The carbon dioxide is withdrawn overhead via line 37 from the separator and the fuel is withdrawn therefrom via line 38 for recycle to a fuel electrode zone.

The carbon dioxide-electrolyte-fuel mixture moves into the separator 36 where the carbon dioxide is disengaged. The electrolyte-fuel mixture also disengages to form a two-phase liquid separation because the components are immiscible. The fuel is skimmed off from the separator for recycle via line 38. The recycle fuel can be returned to the fuel electrode chamber by gravity flow. The higher density electrolyte flows back down along the air electrode as shown in the drawing. If it is found that it is desirable to have more fuel on the electrolyte side of the fuel electrode, pressure may be increased on the fuel side of the electrode or fuel could be injected into the electrolyte between the fuel electrode and the barrier so as to contact the fuel electrode in rising to the surface.

As shown in FIGURE 2 it is to be noted that separator 26 may merely be, in effect, an extension of the electrolyte chamber above the electrodes and barrier 34. This provides the zone necessary to allow disengagement of the carbon dioxide from the electrolyte and fuel and to effectuate separation of the fuel and electrolyte, the latter returning to the electrolyte zone. This system to be operative requires the production of carbon dioxide at the fuel electrode, since the carbon dioxide effects the clockwise movement of the liquid in the electrolyte zone.

The active components of the electrodes and all the modifications described above are well known and need not be described in detail. Suitable catalysts, electrolytes, oxidants and fuel have been described often in the literature and need not be repeated here since this invention provides novel apparatus for more efficient utilization of the fuel cell principle and is not limited to the use of any particular catalyst, electrolyte, etc. Thus, any catalytic material which may promote the half-cell reaction associated with the electrode involved may be used. Naturally, the acidity or basicity of the electrolyte to be used will be considered in choosing the catalyst. Hence, in accordance with this invention any suitable fuel cell catalyst formed in or on the electrode elements may be used.

It will be understood that the term "fuel electrode" as used herein is equivalent to "anode" and that "oxygen electrode" is equivalent to "cathode."

What is claimed is:

1. An improved method for operating a fuel cell having a liquid electrolyte and comprising an electrolyte chamber in contact with a fuel electrode and a cathode which comprises placing a porous barrier in said electrolyte chamber to form within said electrolyte chamber a first and second chamber, the first chamber contacting the fuel electrode and the second chamber contacting said cathode, withdrawing said electrolyte from an upper portion of said first chamber, passing said withdrawn electrolyte to a separator wherein fuel is removed therefrom, and recirculating the electrolyte without said fuel to said second chamber.

2. The process of claim 1 wherein said withdrawn electrolyte is an aqueous acid which contains carbon dioxide formed during the operation of said fuel cell and wherein said carbon dioxide is removed from said withdrawn electrolyte prior to its recycle to said electrolyte chamber.

3. Apparatus for improving the performance of a fuel cell comprising an electrolyte chamber contacting a fuel electrode and a cathode which comprises a porous barrier in said electrolyte chamber, said barrier forming a first and second chamber therein, said first chamber contacting said fuel electrode, said second chamber contacting said cathode, means to withdraw electrolyte and fuel from an upper portion of said first chamber, means to separate said fuel and electrolyte, and means to recycle the separated electrolyte to said second chamber.

4. An improved process for operating a fuel cell comprising an electrolyte chamber contacting a fuel electrode and a cathode and wherein carbon dioxide is liberated at said fuel electrode which comprises placing a porous barrier in said electrolyte to form two chambers, said first chamber being in contact with said fuel electrode, said second chamber contacting said cathode, said first and second chambers communicating in the bottom portion of said electrolyte chamber beneath said porous barrier, and removing electrolyte from the upper portion of said first chamber, removing impurities from said electrolyte and recycling said electrolyte to the upper portion of said second chamber.

5. Apparatus in combination with a fuel cell comprising an electrolyte chamber, a fuel electrode and a cathode which apparatus comprises a porous barrier positioned within said electrolyte chamber to form two chambers therein, said first chamber being in contact with said fuel electrode, said second chamber contacting said cathode, said first and second chambers communicating in the bottom portion of said electrolyte chamber below said porous barrier, means to remove electrolyte with impurities therein from said first chamber, means to separate the impurities from said electrolyte and means to return the electrolyte to the upper portion of the second chamber.

6. The process of claim 1 wherein said electrolyte from said separator is recycled to the lower portion of said second chamber.

7. The process of claim 1 wherein said fuel removed from said withdrawn electrolyte is recycled to a fuel electrode chamber.

8. The apparatus of claim 3 wherein said means to recycle the separated electrolyte directs said separated electrolyte to a lower portion of said second chamber.

9. The process of claim 4 wherein said impurities removed from said electrolyte include carbon dioxide and fuel.

References Cited by the Examiner

UNITED STATES PATENTS 2,901,523 8/59 Justi et al. _____ 136—86
2,901,524 8/59 Gorin et al. _____ 136—86

JOHN H. MACK, *Primary Examiner.*

JOHN R. SPECK, *Examiner.*